(12) United States Patent
Hashimoto et al.

(10) Patent No.: US 11,932,252 B2
(45) Date of Patent: Mar. 19, 2024

(54) VEHICLE CONTROL DEVICE AND STORAGE MEDIUM STORING COMPUTER PROGRAM FOR VEHICLE CONTROL

(71) Applicant: TOYOTA JIDOSHA KABUSHIKI KAISHA, Toyota (JP)

(72) Inventors: Ryuta Hashimoto, Tokyo-to (JP); Eiki Kitagawa, Tokyo-to (JP); Yuma Ito, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/160,773

(22) Filed: Jan. 28, 2021

(65) Prior Publication Data

US 2021/0237776 A1    Aug. 5, 2021

(30) Foreign Application Priority Data

Jan. 30, 2020  (JP) .................................. 2020-013677

(51) Int. Cl.
*B60W 30/18*   (2012.01)
*B60W 40/09*   (2012.01)
*B60W 50/10*   (2012.01)
*B60W 50/12*   (2012.01)
*B60W 60/00*   (2020.01)
(Continued)

(52) U.S. Cl.
CPC ...... *B60W 30/18163* (2013.01); *B60W 40/09* (2013.01); *B60W 50/10* (2013.01); *B60W 50/12* (2013.01); *B60W 60/0059* (2020.02); *G06V 10/764* (2022.01); *G06V 20/58* (2022.01); *G06V 20/588* (2022.01); *G06V 20/59* (2022.01); *B60W 2420/403* (2013.01); *B60W 2420/52* (2013.01); *B60W 2554/4045* (2020.02); *B60W 2554/4049* (2020.02)

(58) Field of Classification Search
None
See application file for complete search history.

(56) References Cited

U.S. PATENT DOCUMENTS

2016/0311464 A1* 10/2016 Yamaoka ........... B62D 15/0255
2018/0118223 A1*  5/2018 Mori .................... B60W 30/12
(Continued)

FOREIGN PATENT DOCUMENTS

JP    2000020898 A    1/2000
JP    2016207060 A    12/2016
(Continued)

*Primary Examiner* — Christian Chace
*Assistant Examiner* — Shayne M. Gilbertson
(74) *Attorney, Agent, or Firm* — Dickinson Wright, PLLC

(57) ABSTRACT

A vehicle control device has a processor configured to decide on standby time for waiting until a vehicle that is capable of automatic control for at least one vehicle operation from among driving, braking and steering is to begin the operation for the lane change, based on either first information indicating the degree to which the driver contributes to control of the vehicle or second information representing the extent to which manual control of the vehicle by the driver is possible, the greater the degree to which the driver contributes to control of the vehicle, represented by the first information, or the extent to which manual control of the vehicle by the driver is possible, represented by the second information, the shorter the standby time.

4 Claims, 6 Drawing Sheets

(51) Int. Cl.
      *G06V 10/764*    (2022.01)
      *G06V 20/56*     (2022.01)
      *G06V 20/58*     (2022.01)
      *G06V 20/59*     (2022.01)

(56) References Cited

U.S. PATENT DOCUMENTS

| | | | |
|---|---|---|---|
| 2018/0148060 A1* | 5/2018 | Hashimoto | B60W 30/18163 |
| 2018/0297611 A1 | 10/2018 | Fujisawa et al. | |
| 2018/0329414 A1* | 11/2018 | Igarashi | B60W 40/08 |
| 2019/0092346 A1* | 3/2019 | Odate | B62D 6/007 |
| 2019/0196487 A1 | 6/2019 | Akiyama et al. | |
| 2020/0247415 A1* | 8/2020 | Tsuji | G05D 1/0223 |
| 2022/0204054 A1* | 6/2022 | Taniguchi | G08G 1/167 |

FOREIGN PATENT DOCUMENTS

| | | |
|---|---|---|
| JP | 2017056779 A | 3/2017 |
| JP | 2017074918 A | 4/2017 |
| JP | 2018047828 A | 3/2018 |
| JP | 2018203120 A | 12/2018 |
| JP | 2019128773 A | 8/2019 |
| WO | 2017085981 A1 | 5/2017 |

\* cited by examiner

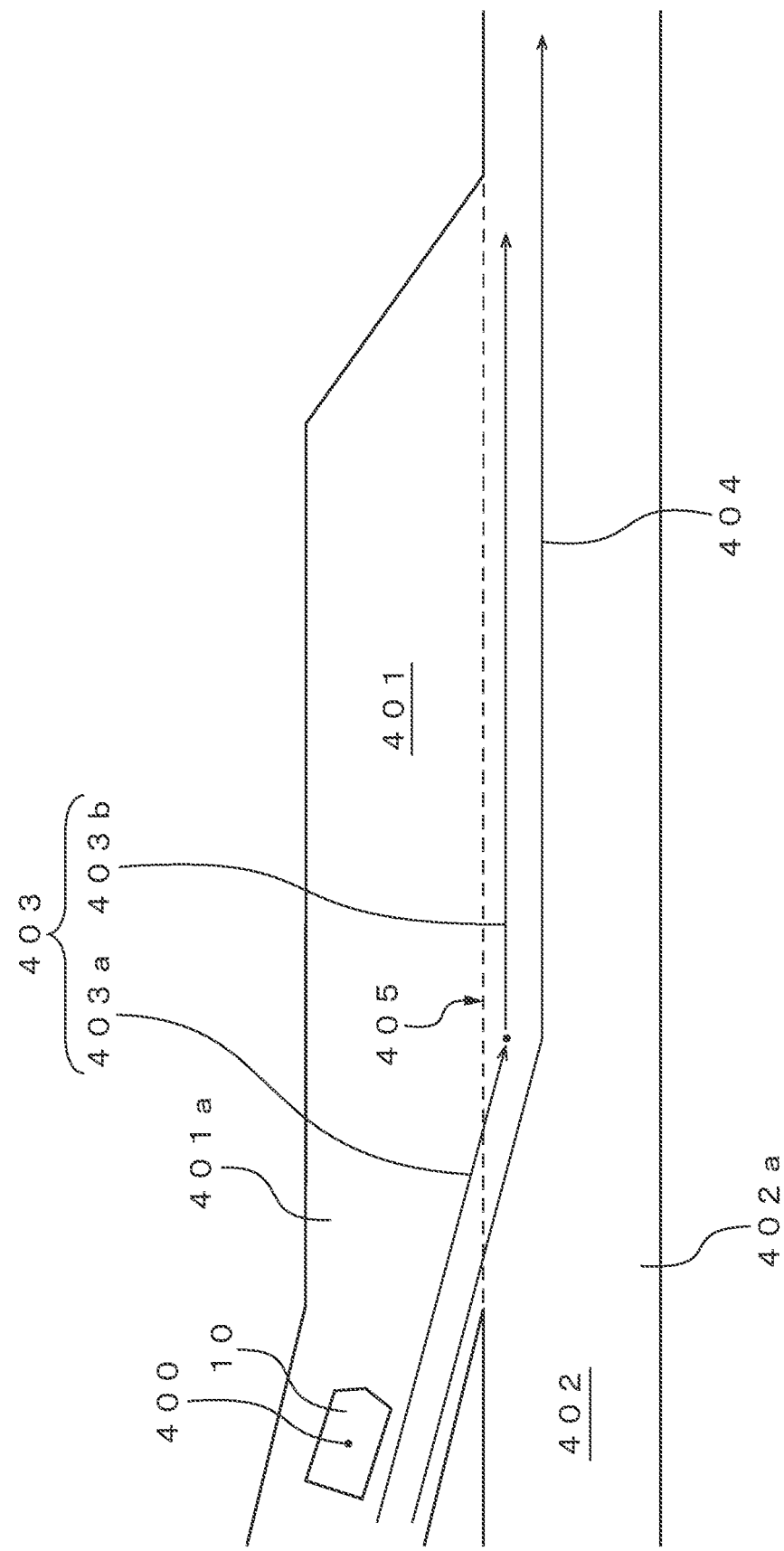

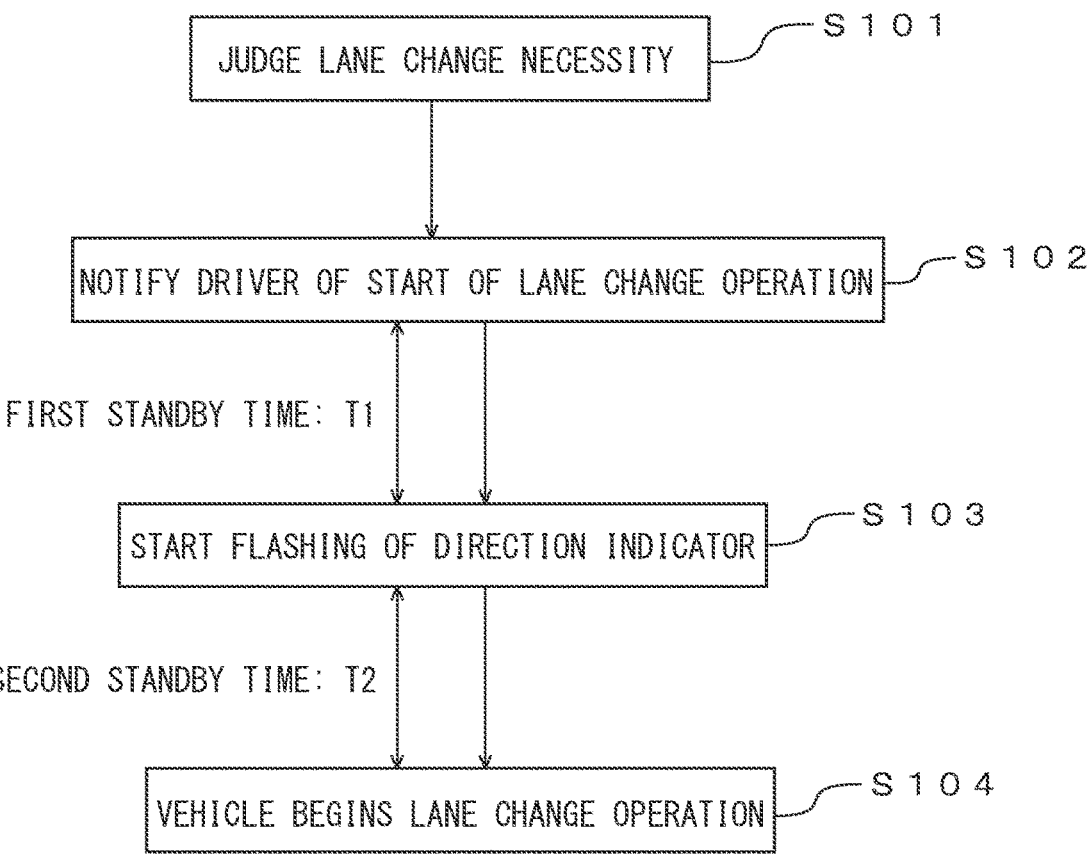

VEHICLE CONTROL DEVICE AND STORAGE MEDIUM STORING COMPUTER PROGRAM FOR VEHICLE CONTROL

FIELD

The present invention relates to a vehicle control device and to a storage medium that stores a computer program for vehicle control.

BACKGROUND

Driving of a vehicle by automatic control is accomplished by creating a scheduled route for the vehicle based on the current location of the vehicle, the destination of the vehicle and map data. The vehicle is controlled to travel along the scheduled route in such a manner that a safe distance is maintained between the vehicle and other vehicles.

The scheduled route may include merge zones for approach to other merging roads from the road on which the vehicle is currently traveling, branching zones for exit from the road on which the vehicle is currently traveling onto other roads that branch from that road, or road zones in which the number of traffic lanes is reduced. In such zones, the vehicle often makes a lane change to move from the currently traveling traffic lane into an adjacent lane.

For example, in the vehicle control system described in Japanese Unexamined Patent Publication No. 2019-128773, completion timing is carried out in which the completion timing for a branching operation is assessed, and when it has been assessed that a first condition or second condition has been established, then a turn signal activating operation is completed. The first condition is that the reference position of the vehicle must be on the branch lane and the ratio of the travel distance of the vehicle with respect to the distance between the upstream end and downstream end of the entrance to the branch lane must exceed a predetermined ratio, while the second condition is that the reference position must be on the branch lane and the distance between a reference line on the main lane and the reference position must exceed a predetermined distance. This allows the vehicle control system to make completion timing for the activating operation more noticeable to the driver when a turn signal activating operation is carried out in synchronization with lane change control for branching.

SUMMARY

It is also preferable that the timing of starting the operation related to the lane change is similar to the driver's feeling. The time required to ascertain the vehicle surroundings during a lane change is expected to be different depending on the conditions in which the driver's surroundings are monitored. When a steering operation is initiated for a lane change after a fixed time has passed upon flashing a direction indicator as mentioned above, the time for monitoring the surroundings of the vehicle by the driver during the lane change may be either excessive or insufficient. When a vehicle is to undergo a lane change, in order to make a successful lane change it is preferred for the steering operation for the lane change to be initiated rapidly after it has been judged that the lane change can be performed and the direction indicator has been flashed. However, initiating the steering operation for the lane change after a fixed time has elapsed after flashing of the direction indicator can potentially result in poor timing for the lane change, as mentioned above.

It is therefore an object of the present invention to provide a vehicle control device that can ensure the necessary time for monitoring of the vehicle surroundings by the driver during a lane change while also carrying out the lane change as rapidly as possible, and that can prevent lengthening of the necessary standby time to increase the probability of a successful lane change.

One embodiment of the invention provides a vehicle control device. The vehicle control device has a processor configured to decide on standby time for waiting until a vehicle that is capable of automatic control for at least one vehicle operation from among driving, braking and steering is to begin the operation for the lane change, based on either first information indicating the degree to which the driver contributes to control of the vehicle or second information representing the extent to which manual control of the vehicle by the driver is possible, the greater the degree to which the driver contributes to control of the vehicle, represented by the first information, or the extent to which manual control of the vehicle by the driver is possible, represented by the second information, the shorter the standby time.

The processor of the vehicle control device is also preferably configured to assess whether or not a lane change is necessary, based on the current location and scheduled route of the vehicle, and the first information preferably includes selected mode information indicating the mode selected by the driver, from among a first mode in which the driver assesses the need for a lane change, a second mode in which the driver approves a lane change assessed to be necessary by the processor, and a third mode in which the driver receives a notification that a lane change assessed to be necessary by the processor is to be carried out.

In particular, the processor of the vehicle control device is preferably configured to assess the degree to which the driver contributes to control of the vehicle to be greater in the order: third mode, second mode, first mode, and determine that the standby time is to be shortened in the order: third mode, second mode, first mode, in response to the mode indicated by the selected mode information.

The second information in the vehicle control device preferably includes information indicating that the driver is operating an operating device by which the vehicle is operated, information indicating the orientation of the face of the driver, or information indicating that the driver is engaged in activity other than driving.

Preferably, the vehicle control device also has a notification device that notifies the driver of vehicle information, the processor is configured to create a vehicle operation plan up to a predetermined time that includes the lane change, based on the scheduled route of the vehicle, the current location of the vehicle and the surrounding environment information of the vehicle, and the standby time includes a first standby time for waiting after the processor has created an operation plan including the lane change and the notification device has been used to notify the driver of start of the operation of the vehicle for the lane change, until flashing of the direction indicator is initiated, and a second standby time for waiting after flashing of the direction indicator has been initiated until the point where operation for lane change of the vehicle is initiated.

The processor in the vehicle control device is also preferably configured to assess the degree of difficulty for the driver to ascertain the environment of the vehicle surroundings, and the processor is also preferably configured to vary the standby time, as the greater the degree of difficulty, the longer the standby time, based on the surrounding environment information of the vehicle.

According to another embodiment there is provided a computer-readable non-transitory storage medium which stores a computer program for vehicle control. The computer-readable non-transitory storage medium stores the computer program that causes a processor to decide on standby time for waiting until a vehicle that is capable of automatic control for at least one vehicle operation from among driving, braking and steering is to begin the operation for the lane change, based on either first information indicating the degree to which the driver contributes to control of the vehicle or second information representing the extent to which manual control of the vehicle by the driver is possible, the greater the degree to which the driver contributes to control of the vehicle, represented by the first information, or the extent to which manual control of the vehicle by the driver is possible, represented by the second information, the shorter the standby time.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating processing for creation of a driving lane plan for a merge zone.

FIG. 5 is a diagram illustrating processing for a lane change.

FIG. 6 is a diagram illustrating the first standby time and second standby time (1).

FIG. 7 is a diagram illustrating the first standby time and second standby time (2).

DESCRIPTION OF EMBODIMENTS

The vehicle control device will now be described with reference to the accompanying drawings. The vehicle control device decides on standby time for waiting until a vehicle that is capable of automatic control for at least one vehicle operation from among driving, braking and steering is to begin the operation for the lane change, based on either first information indicating the degree to which the driver contributes to control of the vehicle or second information representing the extent to which manual control of the vehicle by the driver is possible, the greater the degree to which the driver contributes to control of the vehicle, represented by the first information, or the extent to which manual control of the vehicle by the driver is possible, represented by the second information, the shorter the standby time. The vehicle control device can thus ensure the necessary time for monitoring of the vehicle surroundings by the driver during a lane change while also carrying out the lane change as rapidly as possible, and can prevent lengthening of the necessary standby time to increase the probability of a successful lane change.

The vehicle control system of the vehicle control device of the embodiment has an automatic control operating mode in which the vehicle is operated by automatic control, and a manual control operating mode in which the driver operates the vehicle manually. When automatic control operating mode has been applied, the vehicle control system enables automatic control of vehicle operation including driving, braking and steering. When the driver has approved the control change notification that change from automatic control to manual control is required, the vehicle control system in the automatic control operating mode switches operation of the vehicle from the currently applied automatic control operating mode to manual control operating mode. This allows the driver to operate the vehicle by manual control for driving, when the vehicle cannot perform safe driving by automatic control. In the manual control operating mode, at least one operation of the vehicle from among driving, braking and steering is controlled manually. A change from automatic control to manual control is possible, depending on the request by the driver.

Figure 1:
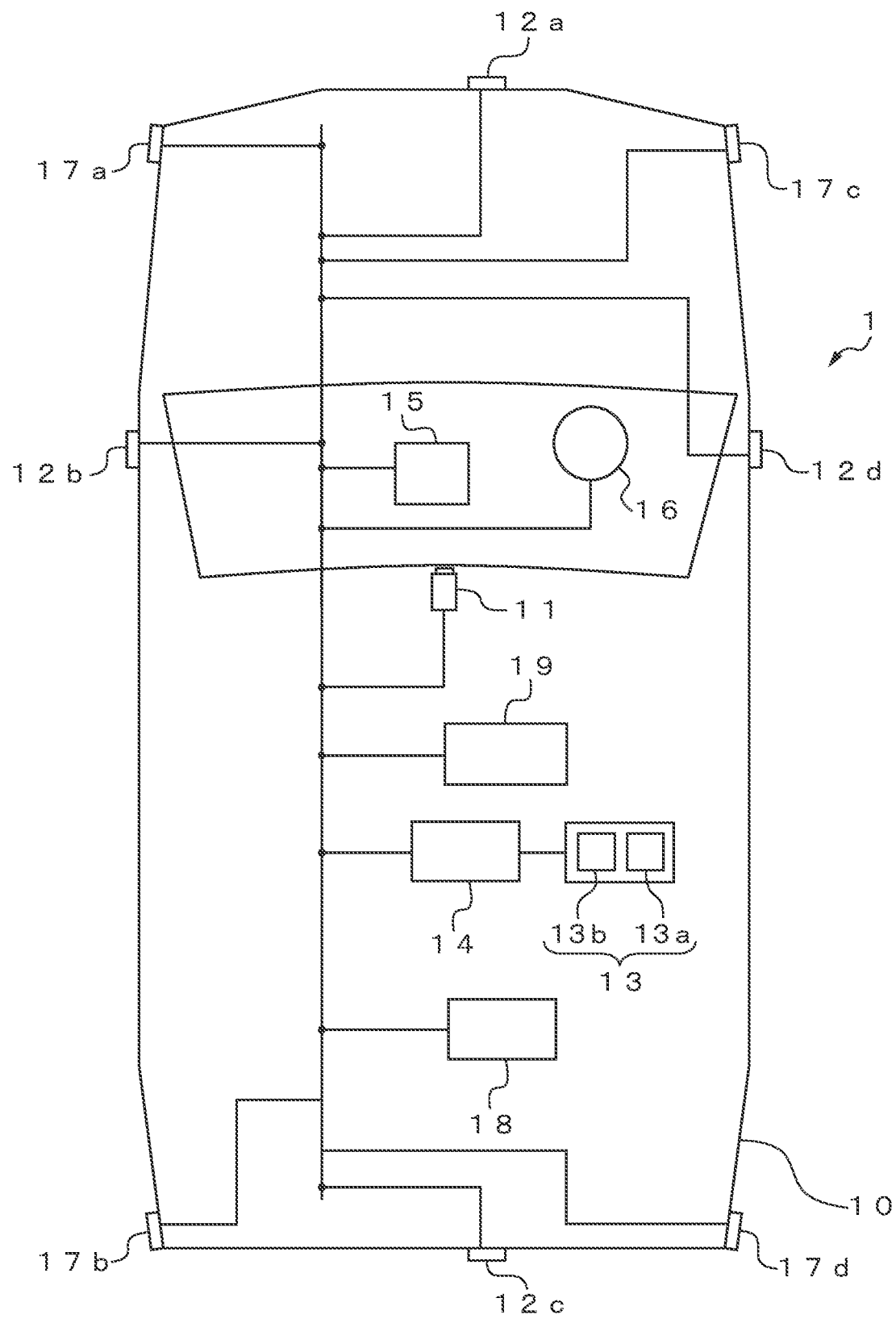
FIG. 1 is a general schematic drawing of a vehicle control system equipped with a vehicle control device.
Figure 2:
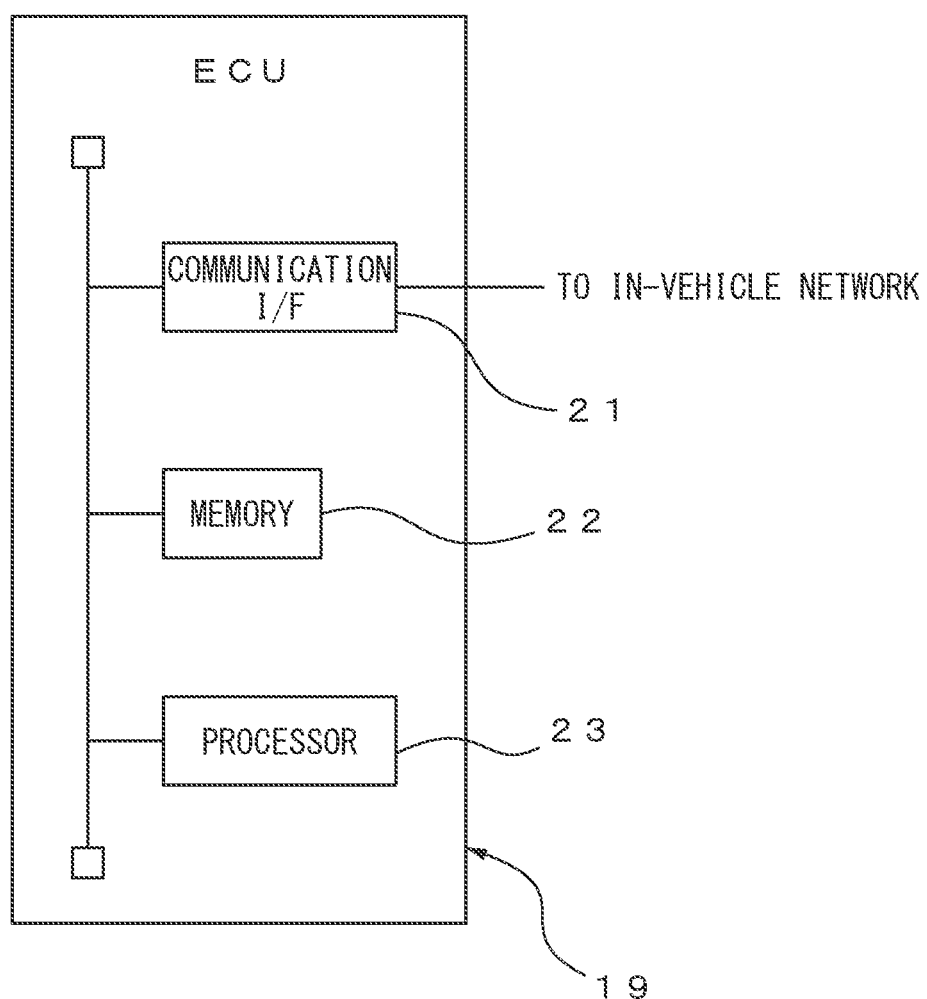
FIG. 2 is a hardware configuration diagram of an electronic control unit as an embodiment of the vehicle control device.

FIG. 1 is a general schematic drawing of a vehicle control system equipped with a vehicle control device. FIG. 2 is a hardware configuration diagram of an electronic control unit as an embodiment of the vehicle control device.

For this embodiment, the vehicle control system 1 that is mounted in the vehicle 10 and controls the vehicle 10 has a camera 11 that takes forward images of the vehicle, and LiDAR sensors 12a to 12d situated on the front and rear and left and right sides of the vehicle 10. The vehicle control system 1 also has a positioning information receiver 13, a map information storage device 14 that produces map information based on positioning information output by the positioning information receiver 13, a user interface (UI) 15, an operating device 16, direction indicators 17a to 17d, a navigation device 18, and an electronic control unit (ECU) 19 as an example of a vehicle control device.

The camera 11, LiDAR sensors 12a to 12d, map information storage device 14, UI 15, operating device 16, direction indicators 17a to 17d, navigation device 18 and ECU 19 are connected in a communicable manner through an in-vehicle network conforming to the Controller Area Network standard.

The camera 11 is mounted inside the compartment of the vehicle 10 and directed toward the front of the vehicle 10. The camera 11 produces an image in which a predetermined region that is ahead of the vehicle 10 is shown at an image information acquisition time set with a predetermined cycle. The image that is produced shows other vehicles around the vehicle 10, or outside features such as road surface lane marking lines that are within the predetermined region ahead of the vehicle 10. The image produced by the camera 11 may be a color image or a gray image. The camera 11 is an example of an imaging unit, and it has a 2D detector composed of an array of photoelectric conversion elements with visible light sensitivity, such as a CCD or C-MOS, and an imaging optical system that forms an image of the photographed region on the 2D detector. The camera 11 outputs the image and the image information acquisition time during which the image was produced, through the in-vehicle network, to the ECU 19 each time an image is produced. At the ECU 19, the image is used for processing to estimate the location of the vehicle, and for processing to detect any other objects around the vehicle 10.

The LiDAR sensors 12a to 12d respectively emit a pulsed laser ahead, to the left, behind and to the right of the vehicle 10, in a synchronized manner, at a distance information acquisition time set with a predetermined cycle, and receive reflected waves that have been reflected from a reflector. The LiDAR sensors 12a to 12d respectively synchronize and emit a pulsed laser ahead, to the left, behind and to the right of the vehicle 10, at a reflected wave information acquisition time set with a predetermined cycle, and receive a reflected wave that has been reflected from a reflector. The time required for the reflected wave to return contains information for the distance between the vehicle 10 and outside features located in the direction in which the laser has been emitted. Each of the LiDAR sensors 12a to 12d outputs the reflected wave information that includes the laser emission direction and the time required for the reflected wave to return, together with the reflected wave information acquisition time at which the laser was emitted, through the in-vehicle network to the ECU 19. The reflected wave information is used for processing by the ECU 19 to detect other objects around the vehicle 10.

The positioning information receiver 13 outputs positioning information that represents the current location of the vehicle 10. The positioning information receiver 13 may be a GPS receiver, for example. The positioning information receiver 13 has a positioning information receiver 13a that receives GPS radio waves, and a processor 13b that outputs positioning information representing the current location of the vehicle 10, based on the GPS radio waves received by the positioning information receiver 13a. The processor 13b outputs positioning information and the positioning information acquisition time at which the positioning information has been acquired, to the map information storage device 14 each time positioning information is acquired by the positioning information receiver 13a at a predetermined receiving cycle.

The map information storage device 14 has a processor (not shown) and a storage device (not shown) such as a magnetic disk drive or a non-volatile semiconductor memory, the storage device storing wide-area map information for a relatively wide area that includes the current location of the vehicle 10 (for example, a range of 10 to 30 square kilometers). The wide-area map information is preferably high precision map information including three-dimensional information for the road surface, information for the types and locations of structures or outside features such as road lane marking lines, and the legal speed limit for the road. The wide-area map information also contains information representing the flatness of the road surface and information for regions with high frequency of weather warnings, such as strong wind warnings. The locations of road features and structures are represented by the world coordinate system, with a predetermined reference location in real space as the origin. The processor receives the wide-area map information from an external server via a base station, by wireless communication through a wireless communication device (not shown) in the vehicle control system 1, in relation to the current location of the vehicle 10, and stores it in the storage device. With reference to the wide-area map information stored in the storage device, the processor outputs the map information for a relatively narrow area including the current location represented by the positioning information (for example, an area of 100 square m to 10 square km), the positioning information and the positioning information acquisition time via the in-vehicle network to the ECU 19, each time positioning information is input from the positioning information receiver 13. The processor of the map information storage device sends positioning information and the positioning information acquisition time through the in-vehicle network to the navigation device 18, each time positioning information and a positioning information acquisition time are received from the positioning information receiver 13.

The UI 15, controlled by the ECU 19, notifies the driver of driving status information of the vehicle 10, map information, expected operation of the vehicle, the vehicle state, proposed lane change execution or a control change notification that change of the vehicle 10 control from automatic control to manual control is required, and produces an operation signal in response to operation of the vehicle 10 by the driver. The driving status information of the vehicle 10 includes information relating to the current location of the vehicle, the scheduled route, and the current future routes of the vehicle that are planned for making the lane change. The driving status information of the vehicle 10 may also contain a driving lane plan as described below, for example. The UI 15 has a liquid crystal display or touch panel, for example, as a notification device that notifies the driver of the driving status information, expected operation of the vehicle, vehicle state or control change notification. The UI 15 also has a touch panel or operating button, for example, as an input device for accepting operation information from the driver to the vehicle 10. The operation information may be, for example, a destination, transit points, vehicle speed and other vehicle control information, as well as the response of the driver to the control change notification. The UI 15 outputs input operation information through the in-vehicle network to the ECU 19.

The operating device 16 has a steering wheel, an accelerator pedal, a brake pedal and a direction indicator switch, for manual operation of the vehicle 10 by the driver when manual control operating mode of the vehicle 10 has been implemented. The operating device 16 generates a control signal corresponding to the degree of steering of the steering operation by the driver, and outputs it to an actuator (not shown) that controls the steering wheel of the vehicle 10. The operating device 16 generates a control signal corresponding to the aperture of the degree of opening of the accelerator in an accelerator pedal operation by the driver, and outputs it to a drive unit (not shown) such as the engine of the vehicle 10. The operating device 16 also generates a control signal corresponding to the amount of braking in a brake pedal operation by the driver, and outputs it to the brake (not shown) of the vehicle 10. In response to operation of the direction indicator switch by the driver, the operating device 16 outputs information indicating a right turn or lane change to the right traffic lane by the vehicle 10, or information indicating a left turn or lane change to the left traffic lane by the vehicle 10, to the direction indicators 17a to 17d.

The direction indicators 17a to 17d are mounted on the outer side of the vehicle 10, for example, and directed toward the left front, left rear, right front and right rear of the vehicle 10. When the vehicle 10 makes a left turn or a lane change to the left traffic lane, the direction indicators 17a, 17b input a flash initiation signal from the ECU 19 or operating device 16, and flash while the vehicle 10 is making the left turn or lane change. When the vehicle 10 makes a right turn or a lane change to the right traffic lane, the direction indicators 17c, 17d input a flash initiation signal from the ECU 19 or operating device 16, and flash while the vehicle 10 is making the right turn or lane change.

The navigation device 18 creates a scheduled route from the current location of the vehicle 10 to the destination, based on navigating map information, the destination of the vehicle 10 and the current location of the vehicle 10. The navigation device 18 has a memory (not shown) that stores the navigating map information, and a processor (not shown). The navigating map information includes link positional information representing the road, and positional information of nodes that are connected by the links. The road configuration on the scheduled route is represented by links representing the roads, and nodes connected by the links. The link and node locations are represented as coordinates on the world coordinate system, for example. The processor creates a scheduled route from the current location of the vehicle 10 to the destination, based on navigating map information stored in a memory, the destination of the vehicle 10 received from the UI 15, and positioning information representing the current location of the vehicle 10, received from the map information storage device 14. The processor creates a scheduled route for the vehicle 10 using the Dijkstra method, for example. The scheduled route includes information relating to the locations of right turns, left turns, merging and branching. The processor produces a new scheduled route for the vehicle 10 when a new destination has been set or when the current location of the vehicle 10 is outside of the scheduled route. The processor outputs the scheduled route through the in-vehicle network to the ECU 19 each time a scheduled route is generated.

The ECU 19 controls traveling of the vehicle 10 according to the implemented operating mode. According to this embodiment, when the vehicle 10 is to execute a lane change while automatic control operating mode is active, the ECU 19 carries out standby time determination processing, based on either first information indicating the degree to which the driver contributes to control of the vehicle 10 or second information representing the extent to which manual control of the vehicle 10 by the driver is possible, whereby it is decided to shorten the standby time for waiting until the vehicle 10 is to begin the operation for the lane change, by the degree to which the driver contributes to control of the vehicle 10, represented by the first information, or the extent to which manual control of the vehicle 10 by the driver is possible, represented by the second information. For this purpose, the ECU 19 has a communication interface 21, a memory 22 and a processor 23.

The communication interface (I/F) 21 is an example of a communication unit, and it has an interface circuit to connect the ECU 19 with the in-vehicle network. Specifically, the communication interface 21 is connected with the direction indicators 17a to 17d via the in-vehicle network. The communication interface 21 is connected with the camera 11 and map information storage device 14, for example, via the in-vehicle network. Each time an image and image information acquisition time are received from the camera 11, for example, the communication interface 21 passes the received image and image information acquisition time to the processor 23. Each time map information, positioning information and a positioning information acquisition time are received from the map information storage device 14, the communication interface 21 passes the received map information, positioning information and positioning information acquisition time to the processor 23. The communication interface 21 passes the vehicle speed, acceleration and yaw rate, received from a vehicle speed sensor, acceleration sensor and yaw rate sensor (not shown), to the processor 23.

The memory 22 is an example of a memory unit, and it has a volatile semiconductor memory and a non-volatile semiconductor memory, for example. The memory 22 stores various data to be used in standby time determination processing carried out by the processor 23 of the ECU 19, installation location information such as the optical axis direction and mounting position of the camera 11, and internal parameters such as the focal length and viewing angle of the imaging optical system. The memory 22 also stores internal parameters such as the installation locations of the LiDAR sensors 12a to 12d and their operable ranges. The memory 22 additionally stores the scheduled route received from the navigation device 18, the image and image information acquisition time received from the camera 11, and the map information, positioning information and positioning information acquisition time received from the map information storage device 14.

The processor 23 comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU. The processor 23 carries out standby time determination processing when the automatic controlled vehicle 10 is to make a lane change. The processor 23 also carries out location estimation processing whereby the location of the vehicle 10 is estimated based on the image produced by the camera 11, at the image information acquisition time when the image was produced. The processor 23 also updates the location of the vehicle 10 at a positioning time set within a predetermined cycle, using vehicle status information for the estimated location and the vehicle speed of the vehicle 10 at the latest image information acquisition time. The processor 23 also controls the running motion of the vehicle 10 based on the relative positional relationship between the estimated location of the vehicle 10, the destination of the vehicle 10 and other objects around the vehicle 10.

Figure 3:
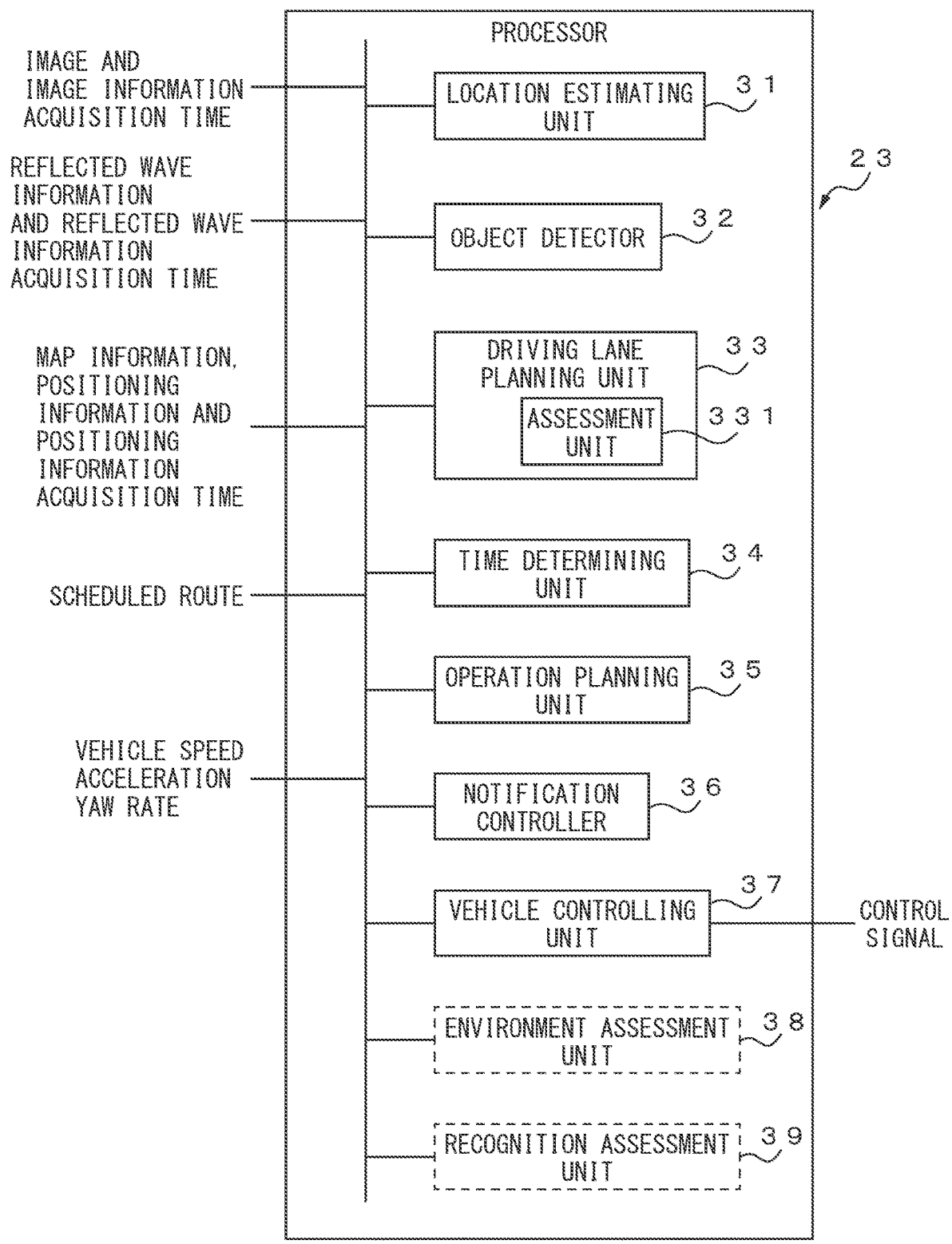
FIG. 3 is a functional block diagram of a processor of an electronic control unit, as it relates to standby time determination processing.

FIG. 3 is a functional block diagram of the processor 23 of the ECU 19, as it relates to vehicle control processing that includes standby time determination processing. The processor 23 has a location estimating unit 31, an object detector 32, a driving lane planning unit 33, a time determining unit 34, an operation planning unit 35, a notification controller 36 and a vehicle controlling unit 37. All or some of the units of the processor 23 are functional modules driven by a computer program operating on the processor 23, for example. Alternatively, all or some of the units of the processor 23 may be specialized computing circuits in the processor 23. Among the parts of the processor 23, the driving lane planning unit 33 and the time determining unit 34 carry out standby time determination processing.

The location estimating unit 31 of the processor 23 estimates the location of the vehicle 10 based on outside features around the vehicle 10. The location estimating unit 31 detects lane marking lines by entering matching regions for detection of lane marking lines formed in the image of the camera 11, as an example of outside features around the vehicle 10, into a discriminator that discriminates the lane marking lines in the image. The discriminator may use a deep neural network (DNN) that has been trained to detect lane marking lines represented in input images, for example. Assuming the location and orientation of the vehicle 10, the location estimating unit 31 projects the lane marking lines represented in the map information received from the map information storage device 14, onto the image of the camera 11 produced at the current image information acquisition time. For example, the location estimating unit 31 determines that the assumed location and assumed orientation of the vehicle 10 are the location of the vehicle 10 represented by the positioning information received from the positioning information receiver 13 at the current image information acquisition time, and the orientation of the vehicle 10 corresponding to the traveling direction of the vehicle 10 as obtained just previously. Based on the assumed location and assumed orientation, the location estimating unit 31 determines a conversion formula from the world coordinate system to the camera coordinate system with the location of the camera 11 as the origin, and with the optical axis direction of the camera 11 as one axial direction. The conversion formula is obtained as a combination between a rotation matrix representing rotation and a translation vector representing parallel movement within the coordinate systems. Using the conversion formula, the location estimating unit 31 converts the coordinates of the lane marking lines on the road around the vehicle 10, which are represented in the world coordinate system and included in the map information, to coordinates in the camera coordinate system. The location estimating unit 31 projects the lane marking lines around the vehicle 10 which are represented in the camera coordinate system, onto the image of the camera 11 produced at the current image information acquisition time, based on the focal length of the camera 11 as an internal parameter of the camera 11. The location estimating unit 31 also calculates the degree of coincidence between the lane marking lines detected from the image of the camera 11 and the lane marking lines around the vehicle 10 represented on the map. The location estimating unit 31 carries out processing such as the coordinate system conversion, projection and calculation of the degree of coincidence as described above, while varying the assumed location and assumed orientation by a predetermined amount, to calculate the degree of coincidence between the lane marking lines detected in the image and the lane marking lines around the vehicle 10 represented in the map information, for each of a plurality of assumed locations and assumed orientations. The location estimating unit 31 also identifies the assumed location and assumed orientation for the maximum degree of coincidence, sets the assumed location as the estimated location of the vehicle 10, and based on that assumed orientation, determines the estimated declination representing the traveling direction of the vehicle 10.

At a positioning time set with a shorter cycle than the cycle of the image information acquisition time at which the camera 11 produced the image, the location estimating unit 31 estimates the estimated location of the vehicle 10 and the estimated declination of the vehicle 10 at the positioning time, based on the estimated location and estimated declination of the vehicle 10, estimated at the image information acquisition time immediately before that positioning time, and the amount of movement and moving direction of the vehicle 10 between the image information acquisition time and the positioning time. The location estimating unit 31 performs time-integration of the speed of the vehicle 10 to determine the amount of movement of the vehicle 10 between the image information acquisition time and positioning time, and time-integration of the yaw rate of the vehicle 10 to determine the moving direction of the vehicle 10 between the image information acquisition time and positioning time. The location estimating unit 31 estimates the road driving lane where the vehicle 10 is located, based on the map information and on the estimated location and estimated declination of the vehicle 10. The location estimating unit 31 also judges, for example, that the vehicle 10 is traveling in a traffic lane defined by two mutually adjacent lane marking lines situated on either side of the center location of the vehicle 10 in the lateral direction. Each time the estimated location, estimated declination and driving lane of the vehicle 10 are determined at the positioning time, the location estimating unit 31 gives notification of this information to the object detector 32, driving lane planning unit 33, operation planning unit 35 and vehicle controlling unit 37. When no positioning information is available at a positioning reception time matching the image information acquisition time, the location estimating unit 31 may estimate the estimated location of the vehicle 10 and the orientation of the vehicle 10 at the image information acquisition time, based on the amount of movement and moving direction of the vehicle 10 between the image information acquisition time and the positioning reception time.

The object detector 32 of the processor 23 detects other objects around the vehicle 10, and their type, based on the image produced by the camera 11. Other objects also include other vehicles traveling around the vehicle 10. The object detector 32 detects objects represented in the image produced by the camera 11, by inputting the image into a discriminator, for example. The discriminator may use a deep neural network (DNN) that has been trained to detect objects represented in input images, for example. The object detector 32 used may also be a discriminator other than a DNN. For example, the discriminator used by the object detector 32 may be a support vector machine (SVM) that has been trained to output a confidence factor for representation of objects to be detected in the window, with the input being a feature descriptor (such as Histogram of Oriented Gradients, HOG, for example) calculated from a window set in the image. Alternatively, the object detector 32 may detect an object region by template matching between the image and a template in which an object to be detected is represented. The object detector 32 may also detect other objects around the vehicle 10 based on reflected wave information output by the LiDAR sensors 12a to 12d. The object detector 32 may also determine the orientation of another object with respect to the vehicle 10 based on the location of the other object in the image produced by the camera 11, and may determine the distance between the other object and the vehicle 10, based on the orientation and on the reflected wave information output by the LiDAR sensors 12a to 12d. The object detector 32 estimates the location of the other object represented in a world coordinate system based on the current location of the vehicle 10, and the distance of the other object from the vehicle 10 and its orientation, for example. The object detector 32 may also track another object to be detected from an updated image, by matching other objects detected in the updated image produced by the camera 11 with objects detected in previous images, according to a tracking process based on optical flow. The object detector 32 may also calculate the trajectory of another object being tracked, based on the location of the object in an image updated from a previous image, represented in the world coordinate system. The object detector 32 can estimate the speed of another object with respect to the vehicle 10, based on changes in the location of the object over the course of time. The object detector 32 can also estimate the acceleration of another object based on changes in the location of the object over the course of time. In addition, the object detector 32 can identify the driving lane in which the other object is traveling, based on the lane marking lines represented in the map information and the location of the object. The object detector 32 also assesses, for example, whether another object is traveling in a traffic lane defined by two mutually adjacent lane marking lines situated on either side of the center location of the other object in the lateral direction. The object detector 32 notifies the driving lane planning unit 33 and operation planning unit 35 of information representing the type of other object (such as vehicle type) that was detected, information indicating its location, and also its speed, acceleration and driving lane.

Based on the map information, the scheduled route of the vehicle 10 to the destination and the current location of the vehicle 10, and at a driving lane-planning time set in a predetermined cycle, the driving lane planning unit 33 of the processor 23 selects a traffic lane on the road on which the vehicle 10 is traveling, within the nearest driving zone (for example, 10 km) selected from the scheduled route as notified from the navigation device 18, and creates a driving lane plan representing the scheduled driving lane for traveling of the vehicle 10. Each time a driving lane plan is created, the driving lane planning unit 33 notifies the operation planning unit 35 of the driving lane plan.

The driving lane planning unit 33 is an example of the assessment unit 331, and for lane changes, it has a first mode in which the driver assesses the need for a lane change (driver trigger mode), a second mode in which the driver approves a lane change judged to be necessary by the driving lane planning unit 33 (plan approval mode), and a third mode in which the driver receives notification of execution of a lane change judged to be necessary by the driving lane planning unit 33 (non-approval mode). In the first mode, the driver judges the necessity and execution of a lane change. The driver who has judged that a lane change is necessary operates a direction indicator switch (not shown), for example, notifying the driving lane planning unit 33 of the driver's request for a lane change, and the destination traffic lane. In the second mode, the driving lane planning unit 33 assesses the need for the lane change and the driver approves execution of the lane change, after which lane change by the vehicle 10 begins. In the third mode, the driving lane planning unit 33 assesses the need for the lane change and lane change by the vehicle 10 begins without obtaining approval by the driver. The driver operates the UI 15 to select the mode for lane change from among the first mode, second mode and third mode. The driving lane planning unit 33 notifies the operation planning unit 35 of selected mode information indicating the mode selected by the driver, each time a mode is selected by the driver.

The driving lane planning unit 33 assesses whether or not a lane change is necessary, depending on the lane change mode indicated by the selected mode information, selected by the driver. When the first mode is active, the driving lane planning unit 33 assesses the need for a lane change based on the driver's request for the lane change. For example, the driving lane planning unit 33 inputs the driver's request for the lane change upon operation of the UI 15 by the driver. When the driving lane planning unit 33 assesses that a lane change is necessary in a driving zone on a scheduled route, it generates a driving lane plan that includes the traffic lane before the change and the traffic lane after the change.

When the second mode and third mode are active, on the other hand, the driving lane planning unit 33 assesses whether or not a lane change is necessary within the nearest driving zone selected from the scheduled route, based on the map information, the scheduled route and the current location of the vehicle 10. The driving lane planning unit 33 may further utilize surrounding environment information or vehicle status information for assessment of whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the driving lane planning unit 33 selects the nearest driving zone from the scheduled route notified from the navigation device 18, at the driving lane-planning time set with the predetermined cycle, selects a traffic lane on the road on which the vehicle 10 is traveling within the driving zone, and creates a driving lane plan. The driving lane planning unit 33 also assesses, based on the scheduled route and the current location of the vehicle 10, whether or not there exists an event location in which at least one of the following events is occurring: the vehicle 10 is approaching another merging road from the road on which it is currently traveling (merge), the vehicle 10 is making a right turn, the vehicle 10 is making a left turn, or the vehicle 10 is exiting from the road on which it is currently traveling to another branching road (branch). When the second mode and third mode are active, the driving lane planning unit 33 assesses whether or not a lane change is necessary if the driving zone includes such an event location. Specifically, the driving lane planning unit 33 assesses whether or not the traffic lane in which an event is to be carried out at an event location is the same as the traffic lane in which the vehicle 10 is currently traveling, and when it is different, it assesses whether or not a lane change is necessary. When the second mode and third mode are active, and it is predicted that the vehicle 10 will impact with another vehicle if that other vehicle travels in the same traffic lane as the one in which the vehicle 10 is traveling and the vehicle 10 continues to travel in that same lane, then the driving lane planning unit 33 assesses that it is necessary to make a lane change. The driving lane planning unit 33 uses the UI 15 to notify the driver of the plan to execute the lane change. When the second mode is active, and approval for execution of the lane change is obtained from the driver, the driving lane planning unit 33 generates a driving lane plan that includes the traffic lane before the change and the traffic lane after the change. When the third mode is active, on the other hand, the driving lane planning unit 33 generates a driving lane plan that includes the traffic lane before the change and the traffic lane after the change, without obtaining approval for execution of the lane change from the driver. When the second mode is active and the plan for executing the lane change is not approved by the driver, the driving lane planning unit 33 generates a driving lane plan to continue traveling in the current traveling traffic lane.

An example of processing by the driving lane planning unit 33 to create a driving lane plan when the second mode and third mode are active will now be explained with reference to FIG. 4 which shows an approach (merge) from a road on which the vehicle 10 is currently traveling to another merging road.

In the example shown in FIG. 4, where the driving zone includes a merge zone that is an event location, the driving lane planning unit 33 assesses whether or not the traffic lane in which the event is to be carried out within the merge zone is the same as the traffic lane in which the vehicle 10 is currently traveling, based on the map information, the scheduled route and the current location of the vehicle 10. When the traffic lane in which the event is to be carried out within the merge zone is different from the traffic lane in which the vehicle 10 is currently traveling, the driving lane planning unit 33 assesses that it is necessary to execute a lane change. The driving lane planning unit 33 generates a driving lane plan that includes moving from the traffic lane in which the vehicle 10 is currently traveling to the traffic lane in which the event is to be carried out within the merge zone, either after approval by the driver when the second mode is active, or without obtaining approval by the driver when the third mode is active.

In the example shown in FIG. 4, the scheduled route 403 for the vehicle 10 includes a route 403a on a road 401, and a route 403b on a road 402 with which the road 401 merges. The current location 400 of the vehicle 10 is on the route 403a. The route 403b is a future route on which the vehicle 10 will travel. The current driving zone 404 includes a merge zone 405 where the road 401 on which the vehicle 10 is currently traveling merges with the other road 402. The driving lane planning unit 33 assesses that the merge zone 405, where the road 401 on which the vehicle 10 is currently traveling approaches the other merging road 402, is an event location within the driving zone 404. The driving lane planning unit 33 is notified by the location estimating unit 31 that the current location 400 of the vehicle 10 is on the traffic lane 401a. Since the driving zone 404 includes the merge zone 405, the driving lane planning unit 33 assesses whether or not a lane change is necessary. In the merge zone 405, the vehicle 10 will move from the traffic lane 401a of the road 401 on which it is currently traveling to the traffic lane 402a of the merging road 402, and therefore the driving lane planning unit 33 assesses that the traffic lane 402a where the event is to be carried out at the event location is different from the traffic lane 401a in which the vehicle 10 is currently traveling. The driving lane planning unit 33 therefore assesses that it is necessary to make a lane change from the traffic lane 401a of the currently traveling road 401 to the traffic lane 402a of the road 402. The driving lane planning unit 33 also creates a driving lane plan in the driving zone 404 that includes a lane change of the vehicle 10 from the traffic lane 401a of the road 401 to the traffic lane 402a of the road 402, before it reaches the merge zone 405.

When the automatically controlled vehicle 10 is to execute a lane change, the time determining unit 34 decides on, based on either first information indicating the degree to which the driver contributes to control of the vehicle 10 or second information representing the extent to which manual control of the vehicle 10 by the driver is possible, the standby time for waiting until the vehicle 10 is to begin the operation for the lane change, the greater the degree to which the driver contributes to control of the vehicle 10, represented by the first information, or the extent to which manual control of the vehicle 10 by the driver is possible, represented by the second information, the shorter the standby time. This embodiment will now be explained in regard to the process by which the time determining unit 34 decides on the standby time based on the first information. If the degree to which the driver contributes to control of the vehicle 10 is large, it is assumed that the driver is also monitoring the area around the vehicle 10 to a greater extent. If the driver is monitoring the area around the vehicle 10 to a greater extent, then it will be possible to ensure the time necessary for monitoring of the vehicle surroundings by the driver during the lane change even with a shorter standby time. Specifically, the first information includes first mode information representing the first mode, second mode information representing the second mode, and third mode information representing the third mode. A first modified example will be explained, in regard to processing by which the time determining unit 34 decides on the standby time based on the second information. Processing by the time determining unit 34 to decide on the standby time for lane change by a vehicle 10 will now be explained with reference to FIG. 5 to FIG. 7.

FIG. 5 is a diagram illustrating the process of assessing the need for and executing a lane change. First, in step S101, the driver judges that a lane change is necessary when the first mode is active, or the driving lane planning unit 33 judges that it is necessary to execute a lane change when the second mode or third mode is active. When the first mode is active, the driving lane planning unit 33 accepts the request for a lane change from the driver using the operating device 16, thus being notified that the driver judges the lane change to be necessary. When the second mode or third mode is active, the driving lane planning unit 33 uses the UI 15 to notify the driver of the plan to execute a lane change. Here, an approval from the driver is obtained to execute the lane change, when the second mode is active. In step S102, when it has been assessed that a lane change can be executed with the relative distance from the vehicle 10 to other vehicles being at least a predetermined distance and with operation of the vehicle 10 satisfying the producing constraints, the operation planning unit 35 described below notifies the driver that operation for the lane change is to begin (preliminary notice of operation for lane change). In the following step S103, the direction indicators 17a to 17d are controlled to begin flashing. In step S104, the vehicle controlling unit 37 described below controls each unit of the vehicle 10 to begin the operation for the lane change. The standby time includes a first standby time T1 for standby from the point at which the driver has been notified of the start of the operation for the lane change until the point at which the direction indicators 17a to 17d begin to flash, and a second standby time T2 for standby from the point at which the direction indicators 17a to 17d have begun to flash until the point at which the vehicle 10 begins the operation for the lane change (for example, steering action with the steering wheel). The first standby time T1 is the time for standby by the processor 23 of the ECU 19 between step S102 and step S103, and the second standby time T2 is the time for standby by the processor 23 of the ECU 19 between step S103 and step S104. Since the relative distance from the vehicle 10 to the other vehicle changes as time elapses from the point at which the driver has been notified of the start of operation for the lane change, the first standby time T1 and second standby time T2 are preferably short from the viewpoint of increasing the success rate for the lane change.

In assessing the degree to which the driver contributes to control of the vehicle 10, the time determining unit 34 assesses the degree to which the driver contributes to control of the vehicle 10 to be greater in the order: third mode represented by third mode information, second mode represented by second mode information, first mode represented by first mode information. The time determining unit 34 therefore decides on a shorter standby time in the order: third mode, second mode, first mode. The time determining unit 34 notifies the operation planning unit 35 of the first standby time T1 and the second standby time T2.

The time determining unit 34 may decide on different times for the first standby time T1 and second standby time T2 for different modes, or it may use a fixed value for the second standby time T2 and decide on a different first standby time T1 for each mode. The time determining unit 34 may also use a fixed value for the first standby time T1 and decide on a different second standby time T2 for each mode.

For example, as shown in FIG. 6, the time determining unit 34 may decide on the first standby time T1 and second standby time T2 for each mode by referring to a Table 600 which is stored in the memory 22. The Table 600 is registered so that the first standby time T1 and second standby time T2 differ depending on the mode. Both the first standby time T1 and the second standby time T2 are shorter in the order: third mode, second mode, first mode.

Alternatively, the time determining unit 34 may decide on the first standby time T1 and second standby time T2 for each mode by referring to a Table 700 which is stored in the memory 22, as shown in FIG. 7. Table 700 registers the first standby time T1 for the first mode as a reference value, the first standby time T1 for the second mode as 1.5× the first mode, and the first standby time T1 for the third mode as 2× the first mode. The first standby time T1 used as the reference value may be in the range of 0.5 to 2 seconds, for example. The second standby time T2 used as the reference value may be in the range of 1.5 to 4 seconds, for example. Table 700 also registers the second standby time T2 for the first mode as a reference value, the second standby time T2 for the second mode as 1.1× the first mode, and the second standby time T2 for the third mode as 1.2× the first mode. Both the first standby time T1 and the second standby time T2 are shortened in the order: third mode, second mode, first mode.

The time determining unit 34 may also vary the first standby time T1 or second standby time T2 determined as described above, based on vehicle status information including the current location of the vehicle 10, and the vehicle speed, acceleration and traveling direction. For example, the time determining unit 34 may vary the first standby time T1 or second standby time T2 determined as described above, based on the speed of the vehicle 10. Specifically, the time determining unit 34 may vary the first standby time T1 or second standby time T2 determined as described above, so that the first standby time T1 or second standby time T2 is lengthened by the average vehicle speed of the vehicle 10 during the nearest predetermined period. The time determining unit 34 may also vary the first standby time T1 or second standby time T2 determined as described above, based on the acceleration of the vehicle 10. Specifically, the time determining unit 34 may vary the first standby time T1 or second standby time T2 determined as described above, so that the first standby time T1 or second standby time T2 is lengthened by the absolute value of the average acceleration of the vehicle 10 in the traveling direction during the nearest predetermined period. The time determining unit 34 may also vary the first standby time T1 or second standby time T2 determined as described above, so that the first standby time T1 or second standby time T2 is lengthened by the absolute value of the average acceleration of the vehicle 10 in the direction perpendicular to the traveling direction, during the nearest predetermined period. The time determining unit 34 may also vary the first standby time T1 or second standby time T2 determined as described above, based on the amount of steering of the vehicle 10. Specifically, the time determining unit 34 may vary the first standby time T1 or second standby time T2 determined as described above, so that the first standby time T1 or second standby time T2 is lengthened by the absolute value of the average amount of steering per unit time of the vehicle 10 in the traveling direction during the nearest predetermined period.

At an operation plan creation time set with a predetermined cycle, the operation planning unit 35 creates an operation plan of the vehicle 10 up until a predetermined time (for example, 5 seconds), based on the map information, the driving lane plan, the current location of the vehicle 10, the surrounding environment information and the vehicle status information. The operation plan is represented as a combination of the target location of the vehicle 10 and the target vehicle speed at the target location, at each time from the current time until the predetermined time. The cycle for the operation plan creation time is preferably shorter than the cycle for the driving lane-planning time. The operation planning unit 35 may determine the target vehicle speed based on a vehicle speed input by the driver or on the legal speed limit for the traffic lane in which it is traveling. The operation planning unit 35 notifies the vehicle controlling unit 37 of the operation plan for each operation plan created. The operation planning unit 35 uses a prediction filter such as a Kalman filter to estimate future trajectories based on the most recent trajectories of other detected vehicles and, based on relative distances calculated from the traffic lanes on which the other detected vehicles are traveling, and their estimated trajectories, it creates an operation plan for the vehicle 10 so that the relative distances from the vehicle 10 to the other vehicles are at least a predetermined distance, and so that operation of the vehicle 10 satisfies the predetermined constraints. The predetermined constraints may be upper limits for change in speed per unit time, change in acceleration per unit time, or change in yaw rate per unit time. The operation planning unit 35 may also create several operation plans based on the driving lane plan. In this case, the operation planning unit 35 may select the operation plan among the multiple operation plans that minimizes the sum of absolute accelerations for the vehicle 10. The operation planning unit 35 notifies the vehicle controlling unit 37 of the operation plan.

When the driving lane plan includes a lane change whereby the vehicle 10 is to move between traffic lanes, the operation planning unit 35 decides on one or more target locations as destinations after a lane change for movement to a traffic lane adjacent to the traffic lane in which it is currently traveling, as destination traffic lanes. The operation planning unit 35 generates an operation plan as a combination of target merge locations for the vehicle 10 and target vehicle speeds for the target merge locations, so that it is toward the one or more target locations, and so that the relative distances from the vehicle 10 to other vehicles are at least a predetermined distance. The operation planning unit 35 assesses that the lane change can be executed when it is possible to create an operation plan wherein the relative distances between the vehicle 10 and other vehicles are at least the predetermined distance and operation of the vehicle 10 satisfies the predetermined constraints. When the operation planning unit 35 has assessed that the lane change can be executed, it uses the UI 15 to notify the driver that operation of the vehicle 10 for the lane change is to begin (preliminary notice of operation for lane change). The operation planning unit 35 waits for the first standby time T1 corresponding to the lane change mode indicated by the selected mode information, for which notification is given by the time determining unit 34, after which flashing of the direction indicators 17a and 17b or 17c and 17d on the target traffic lane side begins. It also waits for the second standby time T2 corresponding to the lane change mode indicated by the selected mode information provided by the time determining unit 34. After the operation planning unit 35 has waited for the second standby time T2, it notifies the vehicle controlling unit 37 of the operation plan. Instead of the operation planning unit 35 waiting for the first standby time T1, the driving lane planning unit 33 may notify the operation planning unit 35 of the driving lane plan after having waited for the first standby time T1. The operation planning unit 35 updates the operation plan at each operation plan creation time even while waiting for the first standby time T1 and the second standby time T2. When it has been judged that the lane change is no longer executable while waiting for the first standby time T1 or second standby time T2, the operation planning unit 35 generates an operation plan whereby traveling continues in the traffic lane that is currently being traveled. The operation planning unit 35 also stops flashing of the direction indicators 17a and 17b or 17c and 17d, while also using the UI 15 to notify the driver that the planned lane change is being canceled. The operation planning unit 35 may also notify the driver of a control change notification through the notification controller 36, after flashing of the direction indicators 17a and 17b or 17c and 17d has begun, and at the point where a predetermined time elapses, or a predetermined distance is traveled, or the mode change determining location preset during the driving lane plan has been reached. The mode change determining location is the location where the lane change under automatic control is canceled and the driver is notified of the control change notification when the vehicle 10 has reached the mode change determining location without being able to execute the lane change. When the driving lane planning unit 33 creates a driving lane plan including the lane change, the mode change determining location is set on the traffic lane in which the vehicle 10 is currently traveling, based on the current location of the vehicle 10.

When the driving lane plan does not include a lane change, the operation planning unit 35 creates an operation plan for the vehicle 10 so that it continues to travel in the currently traveling traffic lane.

When the notification controller 36 inputs a notification request requesting the driver to be notified of the control change notification from the operation planning unit 35, it uses the UI 15 to notify the driver of the control change notification requesting the control of the vehicle 10 to change from automatic control to manual control. The UI 15 inputs an operation signal of the driver in response to the control change notification, and outputs it through the in-vehicle network to the ECU 19. When the driver has approved the first control change notification, the operation planning unit 35 switches operation of the vehicle 10 from the current automatic control operating mode to manual control operating mode.

When self-driving control mode is active, the vehicle controlling unit 37 controls each unit of the vehicle 10 based on the location of the vehicle 10 at the positioning time and the vehicle speed and yaw rate, as well as on the notified operation plan (including the lane change plan), so that the vehicle 10 travels along the notified scheduled route. For example, the vehicle controlling unit 37 determines the steering angle, acceleration and angular acceleration of the vehicle 10 according to the notified operation plan and the current vehicle speed and yaw rate of the vehicle 10, and sets the amount of steering, and the accelerator level, the shift location or the brake level, so as to match that steering angle, acceleration and angular acceleration. The vehicle controlling unit 37 also outputs a control signal corresponding to a set steering amount, to an actuator (not shown) that controls the steering wheel for the vehicle 10. The vehicle controlling unit 37 also determines the amount of fuel injection according to a set accelerator level, and outputs a control signal corresponding to the amount of fuel injection to a drive unit (not shown) of the engine of the vehicle 10. Alternatively, the vehicle controlling unit 37 may output a control signal corresponding to a set brake level to the brake (not shown) of the vehicle 10. When manual operation control mode is active, the vehicle controlling unit 37 generates an accelerator level signal, a shift location signal and a brake signal in response to operation of the operating device 16 by the driver, to control each part of the vehicle 10.

When the operation plan includes a combination of a target trajectory and target vehicle speed for a lane change, the vehicle controlling unit 37 initiates steering of the steering wheel of the vehicle 10 and controls its running motion, so that a lane change is performed.

Figure 8:
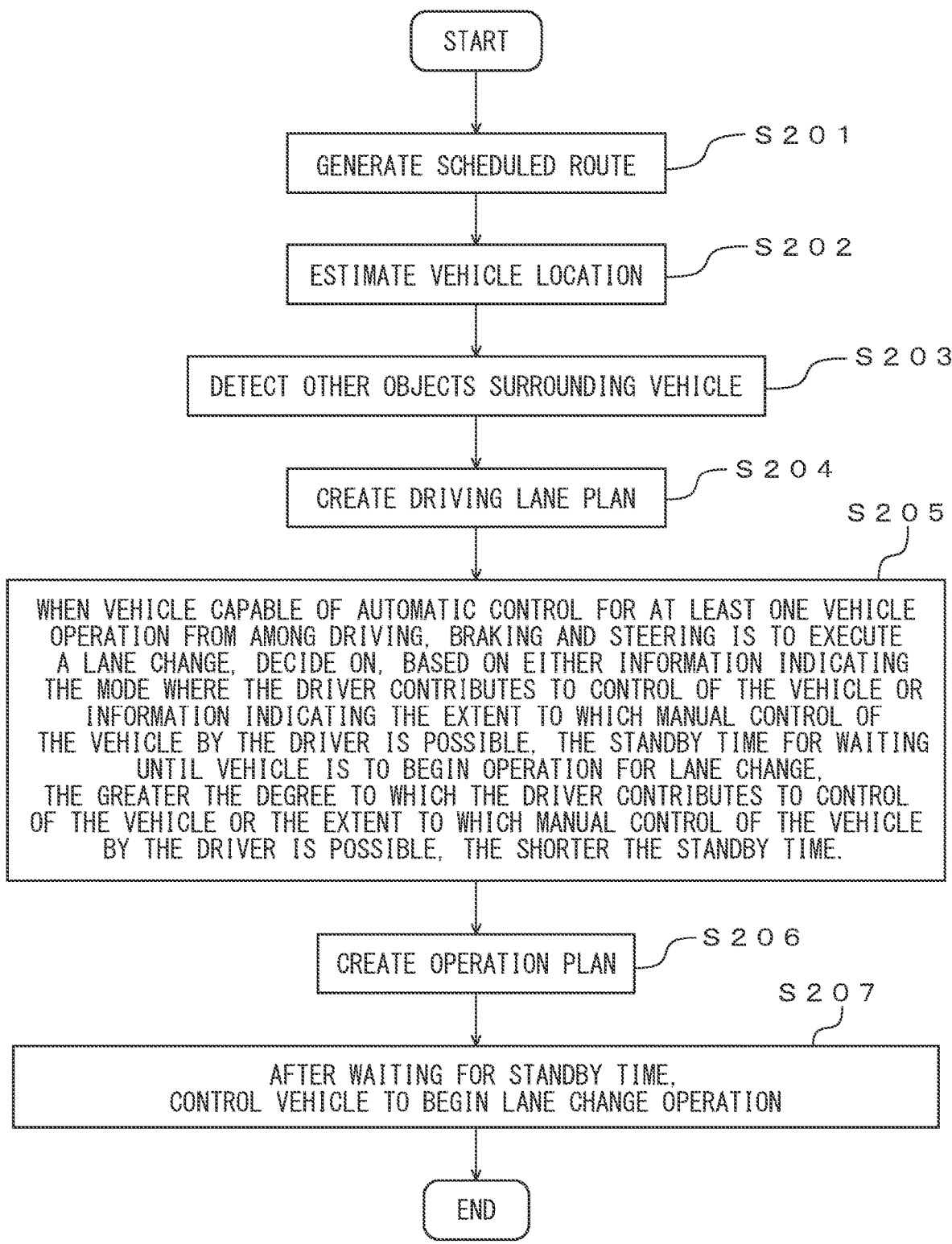
FIG. 8 is an operation flow chart for a vehicle control system, which includes vehicle control processing.

FIG. 8 is an operation flow chart for vehicle control processing that includes standby time determination processing, carried out by the processor 23. In the operation flow chart shown below, the processing of steps S205 and S207 corresponds to the standby time determination processing.

First, the navigation device 18 creates a scheduled route from the current location of the vehicle 10 to the destination, based on navigating map information, the destination of the vehicle 10 and the current location of the vehicle 10 (step S201).

The location estimating unit 31 of the processor 23 then determines the estimated location and estimated declination of the vehicle 10 for each positioning time (step S202).

Next, the object detector 32 of the processor 23 detects other objects around the vehicle 10 based on an image produced by the camera 11 and on reflected wave information generated by the LiDAR sensors 12a to 12d (step S203).

Next, the driving lane planning unit 33 of the processor 23 determines whether or not execution of a lane change is necessary in the driving zone of the scheduled route, based on the map information and the current location of the vehicle 10, selects a traffic lane on the road on which the vehicle 10 is traveling, and generates a driving lane planning unit (step S204).

Next, when the automatically controlled vehicle 10 is to execute a lane change, the time determining unit 34 of the processor 23 decides on, based on either first information indicating the degree to which the driver contributes to control of the vehicle 10 or second information representing the extent to which manual control of the vehicle 10 by the driver is possible, the standby time for waiting until the vehicle 10 is to begin the operation for the lane change, the greater the degree to which the driver contributes to control of the vehicle 10, represented by the first information, or the extent to which manual control of the vehicle 10 by the driver is possible, represented by the second information, the shorter the standby time (step S205).

The operation planning unit 35 of the processor 23 then creates an operation plan for the vehicle 10 up to a predetermined time, at the operation plan creation time set within a predetermined cycle (step S206).

The operation planning unit 35 or vehicle controlling unit 37 of the processor 23 begins operation for the lane change after having waited for the standby time (step S207).

As explained above, the vehicle control device decides standby time for waiting until a vehicle that is capable of automatic control for at least one vehicle operation from among driving, braking and steering is to begin the operation for the lane change, based on either first information indicating the degree to which the driver contributes to control of the vehicle or second information representing the extent to which manual control of the vehicle by the driver is possible, the greater the degree to which the driver contributes to control of the vehicle, represented by the first information, or the extent to which manual control of the vehicle by the driver is possible, represented by the second information, the shorter the standby time. The vehicle control device that can thus ensure the necessary time for monitoring of the vehicle surroundings by the driver during a lane change while also carrying out the lane change as rapidly as possible, and can prevent lengthening of the necessary standby time to increase the probability of a successful lane change. The timing for beginning the operation for the lane change can also be made more noticeable to the driver.

First to third modified examples of the embodiment described above will now be explained. For the first modified example, when the automatically controlled vehicle 10 is to execute a lane change, the time determining unit 34 decides on, based on second information representing the extent to which manual control of the vehicle 10 by the driver is possible, the standby time for waiting until the vehicle 10 is to begin the operation for the lane change, the greater the extent to which manual control of the vehicle 10 by the driver is possible, represented by the second information, the shorter the standby time. If the extent to which manual control of the vehicle 10 by the driver is possible is large, it is assumed that the driver is also monitoring the area around the vehicle 10 to a greater extent. If the driver is monitoring the area around the vehicle 10 to a greater extent, then it will be possible to ensure the time necessary for monitoring of the vehicle surroundings by the driver during the lane change even with a shorter standby time. The standby time includes the first standby time and/or the second standby time. A state representing the extent to which manual control of the vehicle 10 by the driver is possible includes a state where the driver is actually operating a steering gear when automatic control operating mode is active. A state representing the extent to which manual control of the vehicle 10 by the driver is possible may also include a state where the driver is not actually operating the vehicle but the driver is able to operate a steering gear, when automatic control operating mode is active. The extent to which manual control of the vehicle 10 by the driver is possible may additionally include the extent to which the driver is able to manually respond for control of the vehicle 10 (for example, the time required for the driver's response), when control of the vehicle 10 has changed from automatic control operating mode to manual control operating mode.

The second information includes, for example, operation information indicating that the driver is operating an operating device 16 or UI 15 by which the vehicle 10 is operated, information indicating the orientation of the face of the driver, or information indicating that the driver is engaged in activity other than driving. Operation information includes information indicating that the driver is gripping the steering wheel, for example. The time determining unit 34 can detect whether the driver is gripping the steering wheel, using a grip sensor that detects whether the driver is gripping the steering wheel. The time determining unit 34 may shorten the standby time when the steering wheel is being gripped by the driver, compared to when it is not. For example, the time determining unit 34 may estimate the line of sight of the driver based on an image taken of the face of the driver using a camera disposed inside the compartment (not shown), and may obtain information representing the orientation of the driver's face based on the line of sight. The time determining unit 34 may judge that the orientation of the driver's face is toward the front of the vehicle 10 if the time during which the line of sight of the driver is facing the front of the vehicle 10 is longer than a predetermined time. The time determining unit 34 may also shorten the standby time when the orientation of the driver's face is facing the front of the vehicle 10, compared to when it is not. The time determining unit 34 may also judge the orientation of the driver's face using a discriminator trained to recognize face orientation by images taken of the driver's face. The time determining unit 34 may also make judgment using a discriminator trained to recognize both face orientation and openness of the eyes by images taken of the driver's face. The time determining unit 34 may shorten the standby time when the orientation of the driver's face is facing the front of the vehicle 10 and the driver's eyes are opened, compared to other times. The time determining unit 34 may also detect whether or not the driver is engaged in activity other than driving operation, by whether the driver is operating the UI 15 and whether a person is not sitting in the passenger seat. When an actuating signal or operation signal has been input from the UI 15, and a signal indicating that a person is seated has not been input from a seating sensor installed in the passenger seat, the time determining unit 34 determines that the driver is either watching or operating the UI 15, and that the driver is therefore engaged in activity other than driving operation. The UI 15 outputs an actuating signal to the ECU 19 during playback of images. The time determining unit 34 may also assess whether the driver is engaged in activity other than driving operation using a discriminator that has been trained from images of the driver engaged in activity other than driving operation, from among images taken of the driver. Images of the driver engaged in activity other than driving operation may include, for example, images of the driver operating a high-function portable terminal, or images of the driver reading a book. The time determining unit 34 may lengthen the standby time when the driver is engaged in activity other than driving operation, compared to other times.

The time determining unit 34 may decide on, based on both first information indicating the degree to which the driver contributes to control of the vehicle 10 and second information representing the extent to which manual control of the vehicle 10 by the driver is possible, the standby time for waiting until the vehicle 10 is to begin the operation for the lane change, the greater the degree to which the driver contributes to control of the vehicle 10, represented by the first information, the shorter the standby time and the greater by the extent to which manual control of the vehicle 10 by the driver is possible, represented by the second information, the shorter the standby time. For example, the time determining unit 34 may determine the standby time for control to be the average value for a first information standby time determined based on the first information and a second information standby time determined based on the second information.

As a second modified example, the processor 23 comprises an environment assessment unit 38 that assesses the degree of difficulty for the driver to ascertain the environment around the vehicle 10 based on surrounding environment information relative to the vehicle 10, and the environment assessment unit 38 varies the standby time determined by the time determining unit 34, so as to be longer by the degree of difficulty. In cases with a high degree of difficulty for the driver to ascertain the environment around the vehicle 10, it is likely that the driver will take a longer time to monitor the area around the vehicle 10. The standby time is therefore lengthened so that the driver can sufficiently monitor the area around the vehicle 10, thus ensuring the necessary time for the driver to monitor the area vehicle surroundings during a lane change.

Specific examples of surrounding environment information relative to the vehicle 10 include (1) the presence of other vehicles traveling behind the vehicle 10 in the destination traffic lane of the lane change, (2) the number of other vehicles within a predetermined distance from the vehicle 10, (3) a difference between the traveling speed of the vehicle 10 and the traveling speed of a surrounding vehicle that is above a predetermined value, (4) an emergency vehicle traveling near the vehicle 10, (5) poor visibility of another vehicle by the driver due to outside features such as curving of the road on which the vehicle 10 is traveling, (6) the number of traffic lanes of the road on which the vehicle 10 is currently traveling, (7), that the vehicle 10 is currently traveling in a tunnel, (8) a merge point ahead in the traveling direction, (9) weather information that may affect visibility for the driver, such as fog or rain, (10) weather information related to vehicle traveling instability, such as strong winds, (11) brightness of the area around the vehicle 10, (12) flatness of the surface of the road on which the vehicle 10 is currently traveling, or (13) road signs visible to the driver in the area around the vehicle 10.

Processing by the environment assessment unit 38 for compensation of the standby time in cases of the examples (1) to (13) mentioned above will now be explained. (1) Based on information about and the locations of other vehicles input from the object detector 32, and the target location on the destination traffic lane of the lane change for the vehicle 10, input from the operation planning unit 35, the environment assessment unit 38 judges that the difficulty is high when it is estimated that another vehicle is present traveling behind the vehicle 10 on the destination traffic lane, and judges that the difficulty is low in other cases. This is because the driver requires a longer time to look behind, and therefore the time required for the driver to monitor the area around the vehicle 10 is longer. (2) Based on information about and the locations of other vehicles input from the object detector 32, and the estimated location of the vehicle 10 input from the location estimating unit 31, the environment assessment unit 38 judges that the difficulty is high when the number of other vehicles within a predetermined distance (such as 10 m) from the vehicle 10 is above a predetermined number (for example, 2), and judges that the difficulty is low in other cases. This is because the driver requires a longer time to look around depending on the number of other vehicles, and therefore the time required for the driver to monitor the area around the vehicle 10 is longer. (3) Based on information about the locations of and speeds of other vehicles input from the object detector 32, and the traveling speed of the vehicle 10, the environment assessment unit 38 judges that the difficulty is high when the traveling speed of the vehicle 10 and the traveling speed of a surrounding vehicle (for example, within 10 m from the vehicle 10) differ by more than a predetermined value (for example, 10 km/h), and judges that the difficulty is low in other cases. (4) Based on information about and the locations of other vehicles input from the object detector 32, and the estimated location of the vehicle 10 input from the location estimating unit 31, the environment assessment unit 38 judges that the difficulty is high when it is estimated that an emergency vehicle is traveling near the vehicle 10 (for example, within 100 m of the vehicle 10), and judges that the difficulty is low in other cases. This is because the driver must judge whether or not the lane change by the vehicle 10 will interfere with traveling of the emergency vehicle, and therefore the time required for the driver to monitor the area around the vehicle 10 is longer. (5) Based on map information input from the map information storage device 14 and the estimated location of the vehicle 10 input from the location estimating unit 31, the environment assessment unit 38 judges that the difficulty is high when it is estimated that the road that is currently being traveled has curvature above a predetermined curvature, since this makes it less easy for the driver to see other vehicles due to the topographical reason, and judges that the difficulty is low in other cases. (6) Based on map information input from the map information storage device 14 and the estimated location of the vehicle 10 input from the location estimating unit 31, the environment assessment unit 38 judges that the difficulty is high when it is estimated that the number of traffic lanes of the road on which the vehicle 10 is currently traveling is above a predetermined number (for example, 3), and judges that the difficulty is low in other cases. (7) Based on map information input from the map information storage device 14 and the estimated location of the vehicle 10 input from the location estimating unit 31, the environment assessment unit 38 judges that the difficulty is high when it is estimated that the vehicle 10 is currently traveling in a tunnel, and judges that the difficulty is low when it is not. (8) Based on the scheduled route input from the navigation device 18 and the estimated location of the vehicle 10 input from the location estimating unit 31, the environment assessment unit 38 judges that the difficulty is high when it is estimated that a merge point exists ahead in the traveling direction of the vehicle 10, and judges that the difficulty is low in other cases. (9) The environment assessment unit 38 obtains weather information from an external server via a base station, by wireless communication through a wireless communication device (not shown) in the vehicle control system 1, and judges that the difficulty is high when the weather information for the current location of the vehicle 10 includes weather conditions that may affect visibility for the driver, such as fog or rain, and judges that the difficulty is low when it does not. (10) The environment assessment unit 38 obtains weather information from an external server via a base station, by wireless communication through a wireless communication device (not shown) in the vehicle control system 1, and judges that the difficulty is high when the wind speed for the current location of the vehicle 10 is above a predetermined wind speed that may destabilize traveling of the vehicle (for example, a wind speed of 10 m/h), and judges that the difficulty is low when it is not. (11) The environment assessment unit 38 judges that the difficulty is low when the brightness measured using an illuminometer that measures brightness around the vehicle 10 is above a predetermined brightness, and judges that the difficulty is high when it is not. (12) Based on reflected wave information generated by the LiDAR sensors 12*a* to 12*d* or an image taken by the camera 2, the environment assessment unit 38 estimates the flatness of the road surface on which the vehicle 10 is currently traveling, judging that the difficulty is low when the flatness is above a predetermined threshold and judging that the difficulty is high when it is not. (13) Based on map information input from the map information storage device 14 and the estimated location of the vehicle 10 input from the location estimating unit 31, the environment assessment unit 38 judges that the difficulty is low when it is estimated that road signs are present in the area around the vehicle 10 that are visible to the driver, since this makes it easier for the driver to ascertain the environment around the vehicle 10, and judges that the difficulty is high in other cases. This is because visibility of road signs with regulations for traveling by the vehicle 10 and other vehicles helps the driver to ascertain the situation around the vehicle 10, thus shortening the time required for the driver to monitor the area around the vehicle 10.

When the difficulty is high, the environment assessment unit 38 varies to allow a longer standby time than when the difficulty is low. For example, when the difficulty is high, the environment assessment unit 38 may vary to make the standby time 1.1 to 1.5 times longer than when the difficulty is low. The standby time includes the first standby time and/or the second standby time. For example, when the difficulty is high, the environment assessment unit 38 may vary to make the first standby time longer than when the difficulty is low, but without varying the second standby time.

As a third modified example, the processor 23 comprises a recognition assessment unit 39 that assesses whether or not the driver recognizes that a lane change is to be executed, with the recognition assessment unit 39 varying the standby time determined by the time determining unit 34 to be shorter when the driver recognizes that a lane change is to be executed, compared to when the driver does not. For example, the recognition assessment unit 39 assesses that the driver recognizes that a lane change is to be executed (1) when the vehicle 10 is to make a lane change to overtake another vehicle that is ahead, (2) when the vehicle 10 is traveling on a merging lane or on a road with a reducing number of traffic lanes, or (3) when the driver has been notified of the time until execution of a lane change in a branching zone.

Processing by the recognition assessment unit 39 for compensation of the standby time in cases of the examples (1) to (3) mentioned above will now be explained. (1) The recognition assessment unit 39 judges that the driver recognizes that a lane change is to be executed, if another vehicle is traveling within a predetermined distance (for example, 15 m) ahead of the vehicle 10 and the driving lane planning unit 33 generates a driving lane plan based on a request for a lane change by the driver, while first mode is active, or if the driving lane planning unit 33 generates a driving lane plan for execution of a lane change with the vehicle 10 overtaking another vehicle ahead of it, while the second mode and third mode are active, whereas in other cases it judges that the driver does not recognize that a lane change is to be executed. (2) The recognition assessment unit 39 judges that the driver recognizes that a lane change is to be executed, if it is estimated that the vehicle 10 is traveling in a merging lane or on a road with reducing number of traffic lanes, based on map information input from the map information storage device 14, the scheduled route input from the navigation device 18 and the estimated location of the vehicle 10 input from the location estimating unit 31, whereas in other cases it judges that the driver does not recognize that a lane change is to be executed. (3) The driving lane planning unit 33 that has generated a driving lane plan including a lane change in a branching zone provides a notification through the notification controller 36 for the time until the lane change is to be executed, using the UI 15 or a display device that shows flashing of a direction indicator inside the compartment. For example, the time until the lane change is to be executed may be the arrival time until the vehicle 10 reaches the starting point of the branching zone. The arrival time is either displayed using the UI 15, or a display device may be activated that shows flashing of a direction indicator inside the compartment, at a time prior to a predetermined time at which the vehicle 10 reaches the starting point of the branching zone. In this case, since the UI 15 is explicitly notifying the driver of the lane change, the recognition assessment unit 39 judges that the driver recognizes that a lane change is to be executed, whereas otherwise it judges that the driver does not recognize that a lane change is to be executed.

When the driver recognizes that a lane change is to be executed, the recognition assessment unit 39 varies the standby time to be shorter than in other cases. For example, when the difficulty is high, the environment assessment unit 38 may vary to make the standby time 1.1 to 1.5 times longer than when the difficulty is low. The standby time includes the first standby time and/or the second standby time. For example, when the difficulty is high, the environment assessment unit 38 may vary to make the first standby time shorter than when the difficulty is low, but without compensating the second standby time.

The vehicle control device and the storage medium that stores a computer program for vehicle control according to the embodiment described above may incorporate appropriate modifications that are still within the gist of the invention. Moreover, the technical scope of the invention is not limited to this embodiment, and includes the invention and its equivalents as laid out in the Claims.

For example, the first information indicating the degree to which the driver contributes to control of the vehicle and the second information representing the extent to which manual control of the vehicle by the driver is possible, are not limited to those described for the embodiment of the invention. The first information may also indicate, for example, the degree to which the driver contributes to operation control of any operations from among driving, braking and steering of the automatically controlled vehicle.

All examples and conditional language recited herein are intended for pedagogical purposes to aid the reader in understanding the invention and the concepts contributed by the inventor to furthering the art and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions and alterations could be made hereto without departing from the spirit and scope of the invention.

The invention claimed is:

1. A vehicle control device comprising a processor configured to decide on a standby time for waiting until a vehicle that is capable of automatic control for at least one vehicle operation from among driving, braking and steering is to begin an operation for a lane change, based on first information indicating a degree to which a driver contributes to control of the vehicle, a greater the degree to which the driver contributes to control of the vehicle, represented by the first information, a shorter the standby time;
   wherein the standby time comprises a first standby time measured from a time a lane change is determined to be necessary and a driver of the vehicle is notified of the lane change operation to a time when direction indicators are operated, and a second standby time measured from a time when direction indicators are operated until a beginning of the operation for the lane change;
   wherein the first information includes selected mode information indicating the mode selected by the driver, from among a first mode in which the driver assesses the need for a lane change, a second mode in which the driver approves a lane change assessed to be necessary by the processor, and a third mode in which the driver receives a notification that a lane change assessed to be necessary by the processor is to be executed;
   wherein the first standby time is set to be shortest when the first mode is selected, longer than the first mode when the second mode is selected, and longer than the second mode when the third mode is selected, and
   wherein the second standby time is set to be shortest when the first mode is selected, longer than the first mode when the second mode is selected, and longer than the second mode when the third mode is selected.

2. The vehicle control device according to claim 1, which further comprises a notification device that notifies the driver of vehicle information, and wherein the processor is configured to create a vehicle operation plan up to a predetermined time that includes a lane change, based on the scheduled route of the vehicle, the current location of the vehicle and the surrounding environment information of the vehicle.

3. The vehicle control device according to claim 1, wherein the processor is also configured to assess the difficulty for the driver to ascertain the environment of the vehicle surroundings, and
- the processor is also configured to vary the standby time, as the greater the degree of difficulty, the longer the standby time, based on the surrounding environment information of the vehicle.

4. A computer-readable non-transitory storage medium which stores a computer program for vehicle control that causes a processor to decide on a standby time for waiting until a vehicle that is capable of automatic control for at least one vehicle operation from among driving, braking and steering is to begin an operation for a lane change, based on first information indicating a degree to which a driver contributes to control of the vehicle, a greater the degree to which the driver contributes to control of the vehicle, represented by the first information, a shorter the standby time;

wherein the standby time comprises a first standby time measured from a time a lane change is determined to be necessary and a driver of the vehicle is notified of the lane change operation to a time when direction indicators are operated, and a second standby time measured from a time when direction indicators are operated until a beginning of the operation for the lane change;

wherein the first information includes selected mode information indicating the mode selected by the driver, from among a first mode in which the driver assesses the need for a lane change, a second mode in which the driver approves a lane change assessed to be necessary by the processor, and a third mode in which the driver receives a notification that a lane change assessed to be necessary by the processor is to be executed;

wherein the first standby time is set to be shortest when the first mode is selected, longer than the first mode when the second mode is selected, and longer than the second mode when the third mode is selected, and wherein the second standby time is set to be shortest when the first mode is selected, longer than the first mode when the second mode is selected, and longer than the second mode when the third mode is selected.

* * * * *